United States Patent

[11] 3,590,352

| [72] | Inventors | Robert G. Ries<br>Milwaukee;<br>Kenneth W. Retzer, Wauwatosa, both of, Wis. |
|---|---|---|
| [21] | Appl. No. | 819,925 |
| [22] | Filed | Apr. 28, 1969 |
| [45] | Patented | June 29, 1971 |
| [73] | Assignee | Square D Company<br>Park Ridge, Ill. |

[54] FIELD WEAKENING CIRCUIT FOR A SERIES FIELD MOTOR
8 Claims, 1 Drawing Fig.

[52] U.S. Cl. .................................................. 318/246,
318/251, 318/258, 318/350
[51] Int. Cl. .................................................. H02p 5/06
[50] Field of Search .................................. 318/350,
351, 353, 354, 355, 357, 358, 359, 381, 249, 251,
252, 246, 258

[56] References Cited
UNITED STATES PATENTS

| 3,115,018 | 12/1963 | Mobarry | 335/151 |
| 3,230,437 | 1/1966 | Cappello | 318/434 |
| 3,236,350 | 2/1966 | Wintriss | 335/154 |
| 3,360,705 | 12/1967 | Morris | 318/246 |
| 3,384,799 | 5/1968 | Thiele | 318/358 |

*Primary Examiner*—Benjamin Dobeck
*Assistant Examiner*—K. L. Crosson
*Attorneys*—Harold J. Rathburn and William H. Schmeling ABSTRACT: A speed control circuit for a series field direct current motor. The circuit includes a reed relay that has a movable contact responsive to the current flow through the field and a resistance in a shunt circuit with the field. The reed relay through a transistor and a contactor causes the shunt circuit to be interrupted when the current flow through the motor increases above the predetermined value. The reed relay has a pair of coil windings arranged so that one of the windings generates a magnetic flux that opposes the flux generated by the current flow through the field and the other provides an output flux which adds to the flux generated by the field current so that movable contact will operate with a snap action. The flux outputs of each of the pair of coils is individually adjustable so the response of the relay to the upper and lower limits of a range of field current flow may be individually adjusted. The circuit further includes a capacitor which will cause the flux output of one of the coils to momentarily increase when the reed relay initially responds to an excess current in the field circuit.

PATENTED JUN29 1971
3,590,352
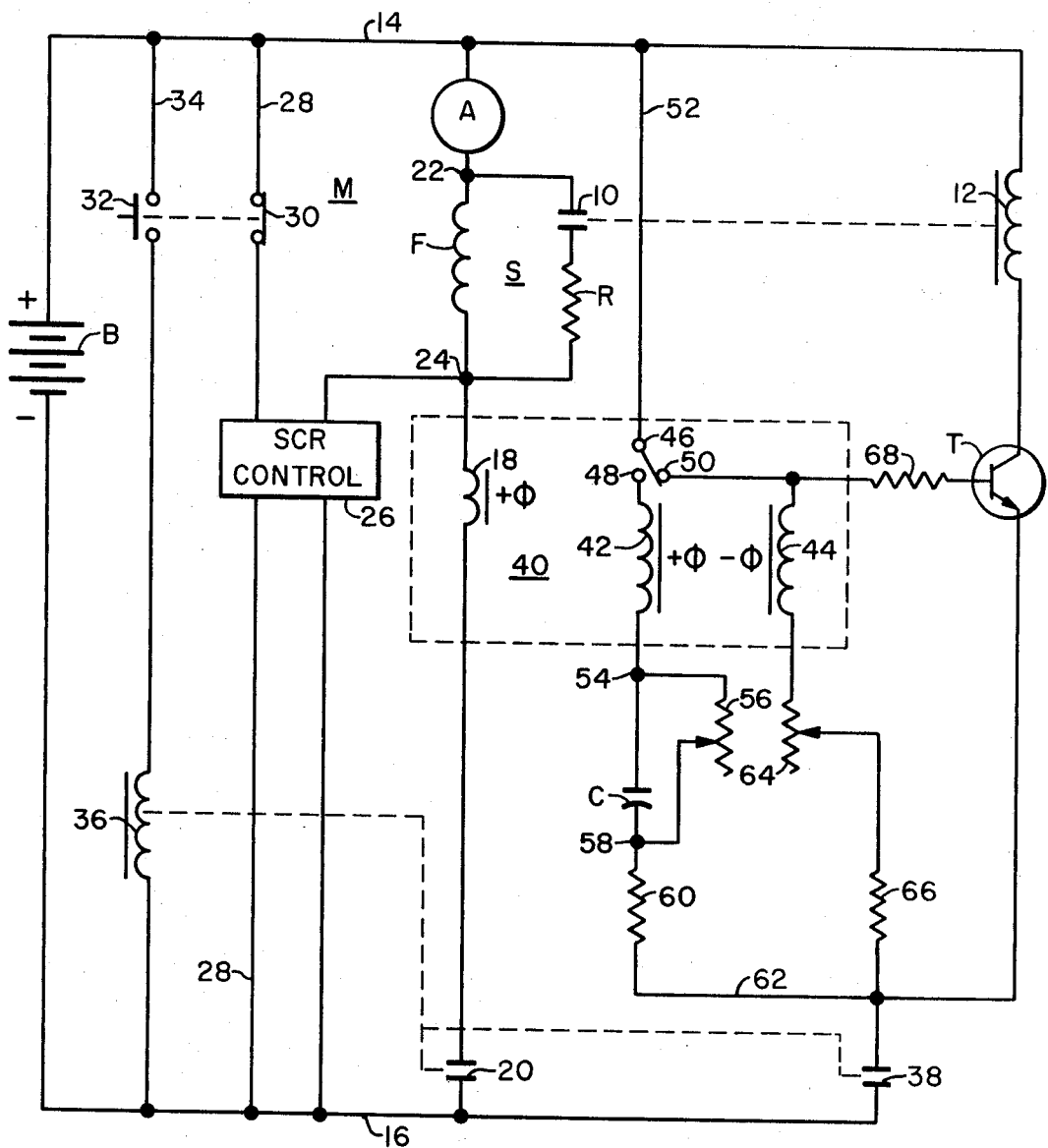
INVENTOR.
ROBERT G. RIES
KENNETH W. RETZER
BY
William H. Schmeling

FIELD WEAKENING CIRCUIT FOR A SERIES FIELD MOTOR

The present invention relates to the speed control of a series field type direct current motor as may be used as a traction motor for a battery operated truck and the like, and more particularly to a circuit which will control a shunt across the series field so the shunt is removed and applied in accordance with the load on the motor.

Economic design of traction motor drive systems in battery powered trucks and the like dictates that the size of the motor be minimized and the power output of the motor be translated through a step down gear train so a maximum driving torque will be present at the driving wheels of the truck. Thus industrial lift trucks generally are considered as slow speed vehicles which are capable of transporting loads which are disportionate to the size of the traction motor. However, in many instances it may be desirable to operate the trucks at speeds above their load carrying speeds, e.g., when the truck is used in a warehouse and an unloaded truck is required to move over a level surface toward a destination to pick up a load. It is well known that the speed of a series motor when used as a traction drive motor for a truck may be increased by reducing the magnetic flux output of the field. This technique is commonly known as field weakening and may be accomplished by connecting a resistive shunt across the field, by the use of tapped fields in the motor, or by splitting the field of the motor. The circuit according to the present invention is capable of being used with any of these arrangements. However, should the load on the motor be increased while the motor is operating under a weakened field condition, the increased current through the motor which accompanies the increased load will cause the motor to operate inefficiently any may rise to a value which will cause damage to the motor or other electrical components in the power circuit for the motor.

It is an object of the present invention to provide a control circuit for a series field type direct current motor wherein a reed relay, which is positioned to have its operation controlled by the current flow through the motor, is used to control the operation of a resistive shunt across the series field.

Another object is to provide a control circuit for a series field type direct current motor wherein a reed relay, which is positioned to have its operation controlled by the current flow through the motor, is used to control the operation of a resistive shunt across the series field and to provide the reed relay with a pair of coils which have controllable flux outputs so the response of the relay to the flux generated by the current flow to the motor may be adjustably controlled.

A further object is to provide a control circuit for a series field type direct current motor wherein a reed relay, which is positioned to have its operation controlled by the current flow through the motor, is used to control the operation of a resistive shunt across the series field and to provide the reed relay with a pair of coils which have controllable flux outputs so the response of the relay to the flux generated by the current flow to the motor may be adjustably controlled and to include a capacitor in a circuit to one of the coils to prevent the sudden change in current flow through the motor which occurs when the circuit through resistive shunt is initially interrupted from affecting the operation of the relay.

Further objects and features of the invention will be readily apparent to those skilled in the art from the specification and appended drawing illustrating a preferred embodiment, in which a schematic wiring diagram of a direct current motor control circuit incorporating the features of the present invention is shown.

In the drawing a series field type direct current motor M has an armature A and a series field F. A shunt S having a resistor R and a pair of normally open contacts 10 is connected across the field F. The contacts 10 are arranged to be closed and complete the shunt across the field F when a coil 12 of a relay or contactor is energized. The operative connection between the contacts 10 and the coil 12 is illustrated by a broken line.

The motor M and the remaining circuits shown in the drawing are energized by a direct current source illustrated by a battery B which has a positive terminal connected to a lead 14 and a negative terminal connected to a lead 16. Connected in a series circuit between the leads 14 and 16 is the armature A, the field F, a current coil 18 and a pair of normally open contacts 20. The current coil 18 may consist of a single turn of the heavy conductor wire which connects the motor M to the battery B. The shunt S, including the contacts 10 and the resistor R, is connected between a junction 22, located between the armature A and the field F, and a junction 24 located between the field F and the current coil 18.

Connected in parallel with the portion of the series circuit, including the contacts 20, is a control 26 known as an SCR control. The control 26 includes circuits employing solid state components and is arranged to control the energization of the motor M and provide the motor with a stepless acceleration and deceleration when the motor is operated at less than its maximum speeds. One form of the control 26 is illustrated in a U.S. Pat. No. 3,361,921 which was granted to the inventors Robert C. Montross and John P. Cooper on Jan. 2, 1968.

As disclosed in the Montross et al. patent, the SCR control 26 includes a pair of silicon controlled rectifiers which are alternately switched to conductive states to supply the motor M with pulses of direct current for the purpose of controlling the speed of the motor. The control 26 is energized through a lead 28 connected between the leads 14 and 16. Included in the lead 28 are the normally closed contacts 30 of a switch. The switch is arranged so the contacts 30 open concurrently with the closure of a pair of normally open contacts 32 in a lead 34 as indicated by a broken line.

The contacts 32, when closed, connect a coil winding 36 across the leads 14 and 16. The coil winding 36, when energized in response to the closure of the contacts 32, causes the contacts 20 as well as a pair of contacts 38 to move to circuit making positions. The operative connection between the coil 36 and the contacts 20 and 38 is illustrated by a broken line. The device which includes the coil winding 36 and the contacts 20 and 38 is known as a shorting contactor, the operation of which is controlled by the switch contacts 32. The shorting contactor including the contacts 20 is provided in the circuit to connect the field F and the armature A directly across the battery B independently of the control 26, for maximum energization or the motor M. Thus when the switch contacts 32 are closed and the switch contacts 30 are opened, the coil winging 36 which causes the closure of the contacts 20 and 38 will be energized and the control 26 will be deactivated so the series motor M will be energized for maximum torque and speed. The energizing circuit for the motor M when contacts 20 are closed includes the lead 14, the armature A, the field F, the current coil 18, the closed contacts 20 and the lead 16.

It is well known that the speed of a series field direct current motor may be increased when the motor is operating under a light torque load if the flux output of the series field is reduced. The circuit as will be described controls the weakening of the series field F to prevent excess current flow through the motor M when the torque load on the motor M requires motor currents which would cause inefficient motor operation or would damage the motor M. The circuit includes a reed delay 40 illustrated by a broken line rectangle. The reed relay 40 has a pair of coil windings 42 and 44, a movable contact 46, and a pair of stationary contacts 48 and 50.

The reed relay 40 is physically positioned so the flux generated by the current coil 18 will be in a direction to cause the contact 46 to move into engagement with the contact 48. The flux output of the current coil 18 is designated as a positive flux in the drawing. The contact 46 is resiliently biased to engage the contact 50 and is connected through a lead 52 to the lead 14. The coil 42 has one end connected to the contact 48 and its other end connected to a junction 54. The junction 54 is connected through a parallel circuit consisting of a capacitor C in one branch and a potentiometer 56 including a slider in the other branch to a junction 58 which is connected through a resistor 60 to the lead 62. The coil 44 has one end connected to the contact 50 and its other end connected through a series circuit including the potentiometer 64 and a resistor 66 to the lead 62. A transistor T has a base electrode connected through a base driven resistor 68 to the contact 50, an emitter electrode directly connected to the lead 62 and a collector electrode connected through the coil 12 to the lead 14. The lead 62 is connected through the contacts 38 to the lead 16 so that the closure of the contacts 38 will permit the circuits containing the coil winding 42, the coil winding 44 and the transistor T to be saturated or unsaturated, depending upon the position of the contact 46 relative to the contacts 48 and 50.

The coil windings 42 and 44 are wound and connected in the circuit so the coil winding 42, when energized, will produce a magnetic flux in a direction to cause the contact 46 to move into engagement with the stationary contact 48, as indicated by the positive flux symbol in the drawing. The coil winding 44, when energized, will produce a magnetic flux in a direction to cause the contact 46 to move into engagement with the contact 50, as indicated by the negative flux symbol in the drawing. The potentiometers 56 and 64 are respectively provided to individually adjust the magnitude of the flux outputs of the coil windings 42 and 44. While not specifically shown, suitable diodes are provided in circuit with the coil windings 12, 36, 42 and 44 to release the inductive energy in the coil windings upon opening of the circuits associated therewith and diodes are provided in circuit with the base, emitter and collector electrodes of the transistor T to provide a suitable bias voltage between the base and the emitter and protect the transistor T against reverse voltages in a manner well known to those skilled in the art to which this invention pertains.

The circuit heretofore described will operate under different speed and torque requirements of the motor M as follows.

If the motor M is operating under a heavy load or the contacts 32 are closed and the contacts 30 are opened before the control 26 has had an opportunity to energize and cause the motor M to accelerate to a speed and torque condition of operation which will permit the flux of the field F to be decreased, the circuit will operate as follows. The opening of the contacts 30 will deactivate the control 26 and the closure of the contacts 32 will cause the coil 36 to be energized and the contacts 20 and 38 to close. The closed contacts 20 will connect the motor M directly across the battery B and because of the operating condition of the motor, the current through the current coil 18 will rise to a high value. However, the closure of the contacts 20 is accompanied by the closure of the contacts 38 so that the circuits including the coil windings 42 and 44, as well as the transistor T, are in a condition to be energized depending upon the position of the contact 46. Prior to the closure of the contacts 20 and 38, the contact 46 will be in engagement with the contact 50. Thus when the contacts 38 are initially closed, the base circuit for the transistor T and the energizing circuit for the coil 44 will be complete so that the transistor will conduct and the coil 44 will tend to provide a flux output which will maintain the contact 46 in engagement with the contact 50. The conducting transistor will cause the coil 12 to be energized. However, because of the differences in response time between the reed relay 40 and the relay or contactor which includes the coil 12, before the contacts 10 close in response to the energization of the coil 12, the flux output of the coil 18 will overcome the flux output of the coil 44 and cause the movable contact 46 to move out of engagement with the contact 50 and into engagement with the contact 48 and complete the circuit to the coil 42 and interrupt the circuits to the coil 44 and the base circuit of the transistor T. Thus the coil 44 will be deenergized and the transistor T will cease to conduct and the coil 12 will be deenergized. The coil 42 when energized, because of the engagement between the contacts 46 and 48, produces a flux which tends to maintain the engagement between the contacts 46 and 48.

If the motor M is operating under a light load and the contacts 32 are closed, and the contacts 30 are opened after the control 26 has had an opportunity to cause the motor to operate under a speed and torque condition which will permit the flux of the field F to be decreased, the circuit will operate as follows.

The opening of the contacts 30 will deactivate the control 26 and the closure of the contacts 32 will cause the coil 36 to be energized and the contacts 20 and 38 to close. The closed contacts 20 will connect the motor M directly across the battery B and cause current to flow through the current coil 18. The closure of the contacts 20 is accompanied by the closure of the contacts 38 so that the circuits including the coil windings 42 and 44 as well as the transistor T are in a condition to be energized, depending upon the position of the contact 46. Prior to the closure of the contacts 38, the contact 46 will be in engagement with the stationary contact 50. Thus when the contacts 38 are initially closed, the base circuit for the transistor T and the energizing circuit for the coil 44 will be complete so that the transistor will conduct and the coil 44 will provide a flux output in a direction to maintain the contact 46 in engagement with the contact 50.

Because of the operating speed of the motor M, the current flow through the coil 18 will be insufficient to generate a flux which will overcome the flux output of the coil 44 and the resilient bias on the contact 46. Thus the contact 46 will remain in engagement with the contact 50 and the transistor will be driven into saturation and cause the coil 12 to be energized and the contacts 10 to close and complete the shunt S across the field F so that the current flow through and flux output of the field F is reduced and the speed of the motor increases to satisfy the power requirements of the load on the motor.

When the motor M is operating in a weakened field condition, and the load on the motor is increased. As may be caused when the truck is required to ascend an incline, the following conditions will occur. The increased load on the motor causes the speed and the back EMF of the motor to decrease. The decreased back EMF causes an increase in current flow through the motor M and the coil 18. When the current flow through the coil 18 increases to a predetermined value, the positive flux output of the coil 18 provides a force which exceeds the force provided by the negative flux from the coil 44 and the resilient bias on the contact 46. The contact 46, in response to the force provided by the flux output of the coil 18, moves from its engaging position with the contact 50 into engagement with the contact 48. The disengagement between the contact 46 and the contact 50 causes the coil 44 to be deenergized so its output negative flux ceases and causes the transistor T to switch to a nonconductive state so that the coil 12 is deenergized. The deenergized coil 12 causes the contacts 10 to open and interrupt the shunt S across the field F. A sudden increase in output flux of the field F and a momentary decrease in current flow through the motor M and the current coil 18 will occur when the shunt S across the field F is interrupted.

The momentary reduced current flow in the current coil 18, as caused by the initial interruption of the shunt S, ordinarily would be sufficient to reduce the output flux of the current coil 18 to a value so that the output flux of the current coil 18 would be incapable of maintaining the contact 46 in engagement with the contact 48. This result is avoided by the presence of the coil 42 which effectively causes the contact 46 to operate with a snap action. As was previously pointed out, the response time of the contactor which includes the coil 12 and the contacts 10 is considerably slower than the reed relay 40. Thus during the interval when the contact 46 moves out of engagement with the stationary contact 50 and into engagement with the contact 48, the contacts 10 will remain closed.

The separation of the contacts 46 and 50 will cause the coil 44 to be deenergized so that its negative output flux will cease to oppose the positive output flux of the coil 18. Additionally, the engagement between the contacts 46 and 48 causes the coil 42 to be energized and provide a positive output flux which aids the flux from the coil 18 in maintaining the contact 46 in engagement with the contact 48. During intervals when the contacts 46 and 48 are separated, the capacitor C is discharged because of the discharge path provided by the potentiometer 56. When the contacts 46 and 48 initially engage and for a period thereafter the capacitor C provides a low impedance path for the current flow through the coil 42 so that its output flux is increased and causes the contact 46 to move into engagement with the contact 48 with a snap action and be maintained in engagement with the contact 48 during the interval when the current flow through the motor M and the current coil momentarily decreases.

The coil 18 preferably consists of a single loop of the heavy conductor wire which supplies the current from the battery B to the motor M. The reed relay 40 is physically positioned relative to the coil 18 so that the contact 46 will move into engagement with the contact 48 when the current flow through the motor M and the coil 18 reaches a preselected value. The output flux of the coil 44 opposes the output flux of the coil 18. Thus an adjustment of the potentiometer 64 will increase or decrease the value of current flow through the coil 18 which will cause the contact 46 to engage the contact 48. The output flux of the coil 42 aids the output flux of the coil 18 and may be increased or decreased by an adjustment of the potentiometer 56 so that the intensity of current flow through the coil 18 which is required to maintain the contact 46 in engagement with the contact 48 may be adjustably varied. An advantage of the circuit heretofore described is that the coils 42 and 44 and their associated adjusting potentiometers 56 and 64 are in two totally independent circuits and thus the operation of one of the circuits will not affect the operation of the other.

While certain preferred embodiments of the invention have been specifically disclosed, it is understood that the invention is not limited thereto, as many variations will be readily apparent to those skilled in the art and the invention is to be given its broadest possible interpretation with the terms of the following claims.

What we claim is:

1. A control circuit for a series field type direct current motor comprising: a solid-state control connected between a direct current source and the motor for supplying the motor with regulated pulses of direct current, an electromechanical switching device having a first pair of normally open contacts, a second pair of normally open contacts and a coil arranged to close the first and the second pairs of contacts when the coil is energized, a circuit controlling the energization of the coil from the source, a shunt for the series field of the motor, a first circuit including the first pair of contacts and a current coil connected in series between the field and the direct current source and in parallel with the solid-state control for connecting the motor directly across the source independently of the solid-state control, a reed relay physically positioned to be magnetically coupled to the current coil, said relay having a movable contact that is resiliently biased to a first position and arranged to be moved from the first position to a second position by the magnetic flux generated by the current flow through the current coil when the current flow through the first circuit exceeds a predetermined value, and means connected to be operative upon the closure of the second pair of contacts and including a contactor having a speed of response slower than the speed of response of the reed relay and controlled by the movable contact of the reed relay for connecting the shunt when the movable contact is in the first position and for disconnecting the shunt when the movable contact is in the second position.

2. The circuit as recited in claim 1 wherein the reed relay includes a pair of stationary contacts that are arranged so a first one of the pair of stationary contacts is engaged by the movable contact when the movable contact is at the first position and a second one of a pair of stationary contacts is engaged by the movable contact when the movable contact is at the second position, a first coil winding connected through a second circuit that includes the first stationary contact and the movable contact to the source when the movable contact is at the first position to produce a magnetic flux which opposes the flux generated by the current coil and a second coil winding connected through a third circuit that includes the second stationary contact and the movable contact to the source when the movable contact is at the second position to produce a magnetic flux which aids the flux generated by the current coil.

3. The circuit as recited in claim 2 wherein the second and third circuits each have means for adjusting the flux produced by the first and second coil windings.

4. The circuit as recited in claim 2 wherein the means controlled by the movable contact for disconnecting the shunt includes a transistor, a circuit including a base of the transistor and the first stationary contact for connecting the base to the source when the movable contact is at the first position and the contactor has a coil winding connected to the source through a circuit that includes an emitter and a collector of the transistor so as to be energized when the movable contact is in the first position and a pair of contacts in the shunt for disconnecting the shunt when the movable contact is at the second position and connecting the shunt when the movable contact is at the first position.

5. The circuit as recited in claim 2 wherein the third circuit includes a capacitance connected in the third circuit in series with the second coil to be charged from the source when the movable contact engages the second contact so that the flux generated by the second coil is increased when the movable contact initially engages the second contact.

6. The circuit as recited in claim 3 wherein the means controlled by the movable contact for disconnecting the shunt includes a transistor, a circuit including a base of the transistor and the first stationary contact for connecting the base to the source when the movable contact is at the first position and the contactor has a coil winging connected to the source through a circuit that includes an emitter and a collector of the transistor so as to be energized when the movable contact is in the first position and a pair of contacts in the shunt for disconnecting the shunt when the movable contact is at the second position and connecting the shunt when the movable contact is at the first position.

7. The circuit as recited in claim 6 wherein the third circuit includes a capacitance connected in the third circuit in series with the second coil to be charged from the source when the movable contact engages the second contact so that the flux generated by the second coil is increased when the movable contact initially engages the second contact.

8. The circuit as recited in claim 3 wherein the third circuit includes a capacitance connected in the third circuit in series with the second coil to be charged from the source when the movable contact engages the second contact so that the flux generated by the second coil is increased when the movable contact initially engages the second contact.

PO-1050
(5/69)

UNITED STATES PATENT OFFICE
CERTIFICATE OF CORRECTION

Patent No. 3,590,352            Dated June 29, 1971

Inventor(s) Robert G. Ries

It is certified that error appears in the above-identified patent and that said Letters Patent are hereby corrected as shown below:

Title Page, in the abstract, line 12, cancel "that" and insert --the--.
Col. 1, true line 32 (appearing as line 34), cancel "any" and insert --and--.
Col. 2, true line 44 (appearing as line 45), cancel "or" and insert --of--.
Col. 6, line 45, cancel "winging" and insert --winding--.

Signed and sealed this 4th day of January 1972.

(SEAL)
Attest:

EDWARD M. FLETCHER, JR.          ROBERT GOTTSCHALK
Attesting Officer                Acting Commissioner of Patents